(12) United States Patent
Hamada et al.

(10) Patent No.: US 6,304,057 B1
(45) Date of Patent: Oct. 16, 2001

(54) STRUCTURE FOR FIXING ELECTRODE PLATE GROUPS IN CELLS THAT CONSTITUTE A BATTERY MODULE

(75) Inventors: Shinji Hamada, Toyohashi; Noriyuki Fujioka, Kosai; Nobuyasu Morishita, Toyohashi; Munehisa Ikoma, Toyohashi, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/680,296

(22) Filed: Oct. 6, 2000

(30) Foreign Application Priority Data

Oct. 8, 1999 (JP) ................. 11-288795

(51) Int. Cl.[7] ................. H01M 10/46
(52) U.S. Cl. ................. 320/107
(58) Field of Search ................. 320/107, 110, 320/112, 116

(56) References Cited

U.S. PATENT DOCUMENTS 3,844,841   10/1974   Baker .
4,693,535    9/1987   Frode .

FOREIGN PATENT DOCUMENTS

| 0264862 | 4/1988 | (EP) . |
| 0962993 | 12/1999 | (EP) . |
| 1059680 | 12/2000 | (EP) . |
| 7161377 | * 6/1995 | (JP) . |
| 7220715 | * 8/1995 | (JP) . |
| 99/21236 | 4/1999 | (WO) . |

* cited by examiner

Primary Examiner—Edward H. Tso
(74) Attorney, Agent, or Firm—Greenblum & Bernstein, P.L.C.

(57) ABSTRACT

A battery module is constructed with a plurality of prismatic cells. Each cell comprises a prismatic cell case having short lateral walls and long lateral walls, a group of electrode plates constituted by laminating a plurality of positive and negative electrode plates parallel to the long lateral walls of the cell case with intervening separators therebetween, and collector plates of positive and negative polarities, respectively bonded to the positive and negative electrode plates at lateral opposite ends of the group of electrode plates. Connection projections are formed on the collector plates, these being fitted into corresponding holes in the short lateral walls of the cell case, whereby the collector plates are fixed on the short lateral walls of the cell case.

4 Claims, 3 Drawing Sheets

STRUCTURE FOR FIXING ELECTRODE PLATE GROUPS IN CELLS THAT CONSTITUTE A BATTERY MODULE

BACKGROUND OF THE INVENTION

1. Field of the Invention

The present invention relates to a battery module constituted by a plurality of prismatic cells connected adjacent each other, each of the cells accommodating therein an electrode plate group, comprising laminated positive and negative electrode plates with intervening separators therebetween, and particularly to the structure for fixing the electrode plate group in position within the cell.

2. Description of Related Art

Alkaline rechargeable batteries such as nickel metal hydride batteries are superior in energy density characteristics and have been used as the power source for an electric vehicle in recent years. Japanese Laid-Open Patent Application No. 7-161377 proposes a rechargeable battery, that is compact yet outputs a large amount of energy, in which a prismatic battery case accommodates therein, together with liquid electrolyte, positive and negative electrode plates stacked upon one another parallel to the long lateral walls of the battery case with intervening separators therebetween, the open end of the battery case being sealed with a lid member.

The battery disclosed in this publication is further described with reference to FIG. 4. Reference numeral 31 and 32 respectively denote a battery case and a cover, both made of polypropylene. An electrode plate group 33 is accommodated within the battery case 31 together with liquid electrolyte, and the open end of the battery case is sealed with the cover 32. The electrode plate group 33 comprises a plurality of negative electrode plates that are obtained by applying a paste mainly consisting of hydrogen-absorption alloy onto a flat plate core material, and a plurality of positive electrode plates that are obtained by packing powder mainly consisting of nickel hydroxide in a core material made of nickel porous material, these positive and negative electrode plates being laminated alternately with intervening separators made of polypropylene that is treated to obtain hydrophilicity. The positive electrode plates and the negative electrode plates are respectively connected to a positive and a negative electrode columns 35a, 35b through respective collector plates 34a, 34b, and the positive and negative electrode columns 35a, 35b are fixedly mounted to the cover 32. In this state, there is a gap $t_1$ of about 2 to 10 mm between the bottom of the electrode plate group 33 and the inner bottom face of the battery case 31, and a gap $t_2$ of about 1 to 5 mm between the lateral edges of the electrode plate group and the inner lateral face of the battery case.

These gaps $t_1$, $t_2$ are formed for the purpose of: 1) making the liquid distribution of electrolyte uniform, and 2) preventing the electrode plate group 33 from being compressed by the inner walls of the battery case 31 when the electrode plate 33 expands during the charging and discharging of the battery. This is because deformation of the electrode plate group 33 may lead to inefficient use of active material and deterioration of discharge capacity, rises in the internal pressure during charging, short-circuits, or peeling of active material from the electrode plates.

However, in the sealed prismatic battery described above, the electrode plate group 33 is fixed to the cover 32 through the electrode columns 35a, 35b. Accordingly, there are variations in the position of the electrode plate group 33 with respect to the battery case 31 due to the positional displacement between the battery case 31 and the cover 32 during welding, and the gaps $t_1$, $t_2$ are not uniformly formed, and electrode plates are sometimes deformed, leading to aforementioned various problems such as deterioration of discharge capacity due to insufficient use of active material, rises in the internal pressure during charging, and peeling of active material from the electrode plates. Further, there was the problem that the liquid electrolyte could not be distributed uniformly.

SUMMARY OF THE INVENTION

In view of these problems of the prior art, it is an object of the present invention to provide an improved structure for sealed prismatic cells that constitute a battery module, in which the electrode plate group can be fixed in position with respect to the cell case regardless of positional displacement between the cell case and a lid member for sealing the cell case, so that the battery performance is not compromised by the deformation of the electrode plates caused by the expansion/contraction of the electrode plates during charging and discharging, and in which liquid electrolyte can be uniformly distributed.

To achieve the above object, in a battery module according to the present invention that is constituted by a plurality of cells connected together adjacent each other, each of the plurality of cells comprises:

- a prismatic cell case having short lateral walls and long lateral walls;
- a group of electrode plates constituted by laminating a plurality of positive electrode plates and a plurality of negative electrode plates parallel to the long lateral walls of the cell case with intervening separators therebetween;
- a collector plate of positive polarity and a collector plate of negative polarity, respectively bonded to the plurality of positive electrode plates and to the plurality of negative electrode plates at lateral opposite ends of the group of electrode plates, wherein each of the collector plates is fixed on the short lateral walls of the cell case so as to arrange the group of electrode plates in a predetermined position within the cell case;
- liquid electrolyte accommodated in the cell case; and
- a lid member for sealing an open end of the cell case.

Since the electrode plate group is fixed to the cell case through the collector plates, it can properly be fixed in position with respect to the cell case regardless of positional displacement between the lid member and the cell case that occur when welding them together, and therefore, there can be provided sufficient gaps between the electrode plate group and the inner bottom or lateral faces of the cell case to allow expansion and contraction of the electrode plates during charging and discharging, whereby deterioration of the battery performance resulting from deformation of the electrode plates can be prevented.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

The present invention is embodied in the form of a sealed prismatic battery module, constructed with a plurality of prismatic cells. One preferred embodiment of the present invention will be hereinafter described with reference to FIG. 1 to FIG. 3.

Figure 1:
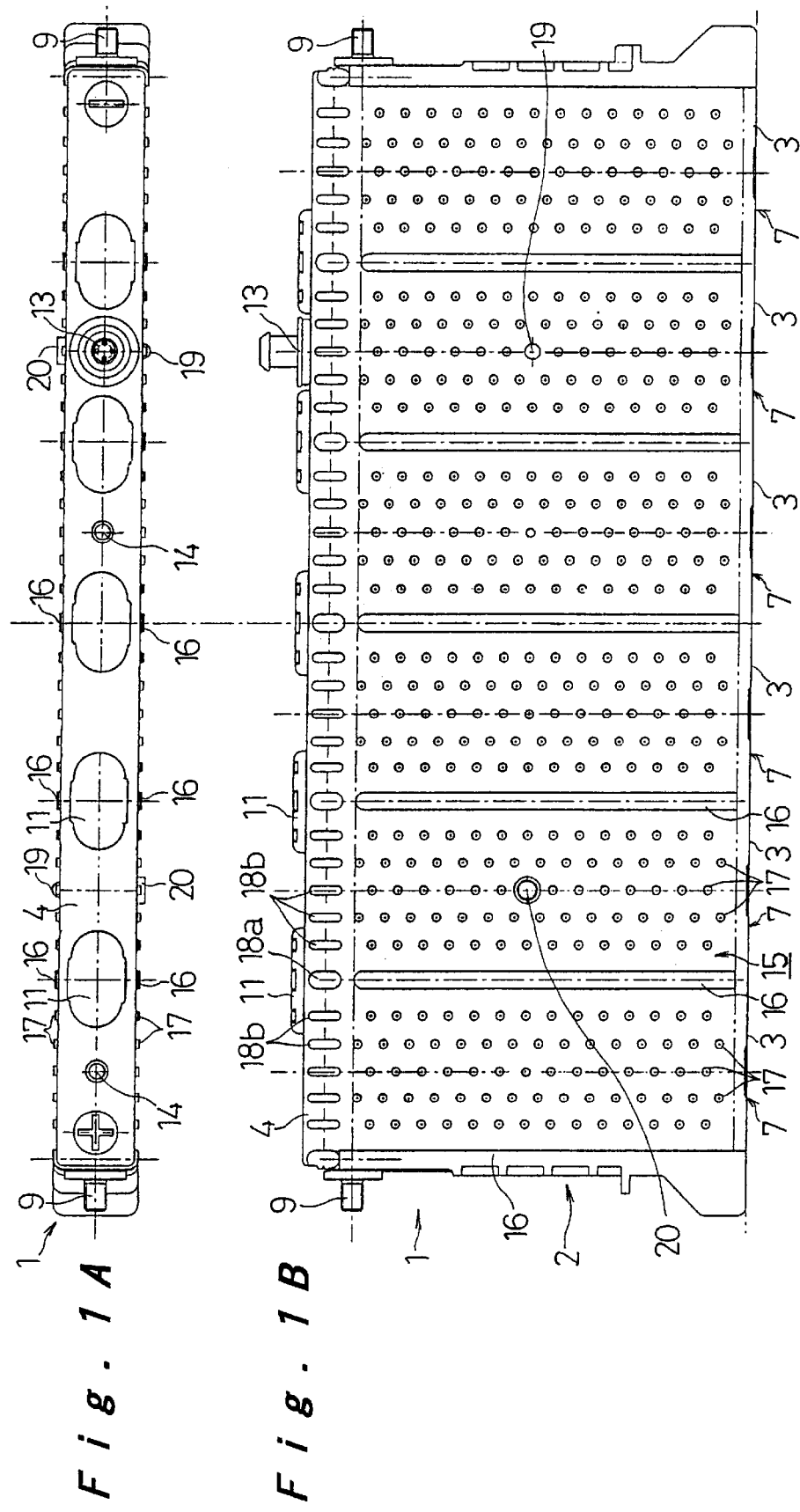
FIG. 1A is a top plan view and FIG. 1B is a front view showing a battery module, in which a sealed prismatic battery according to one embodiment of the present invention is applied.
Figure 2:
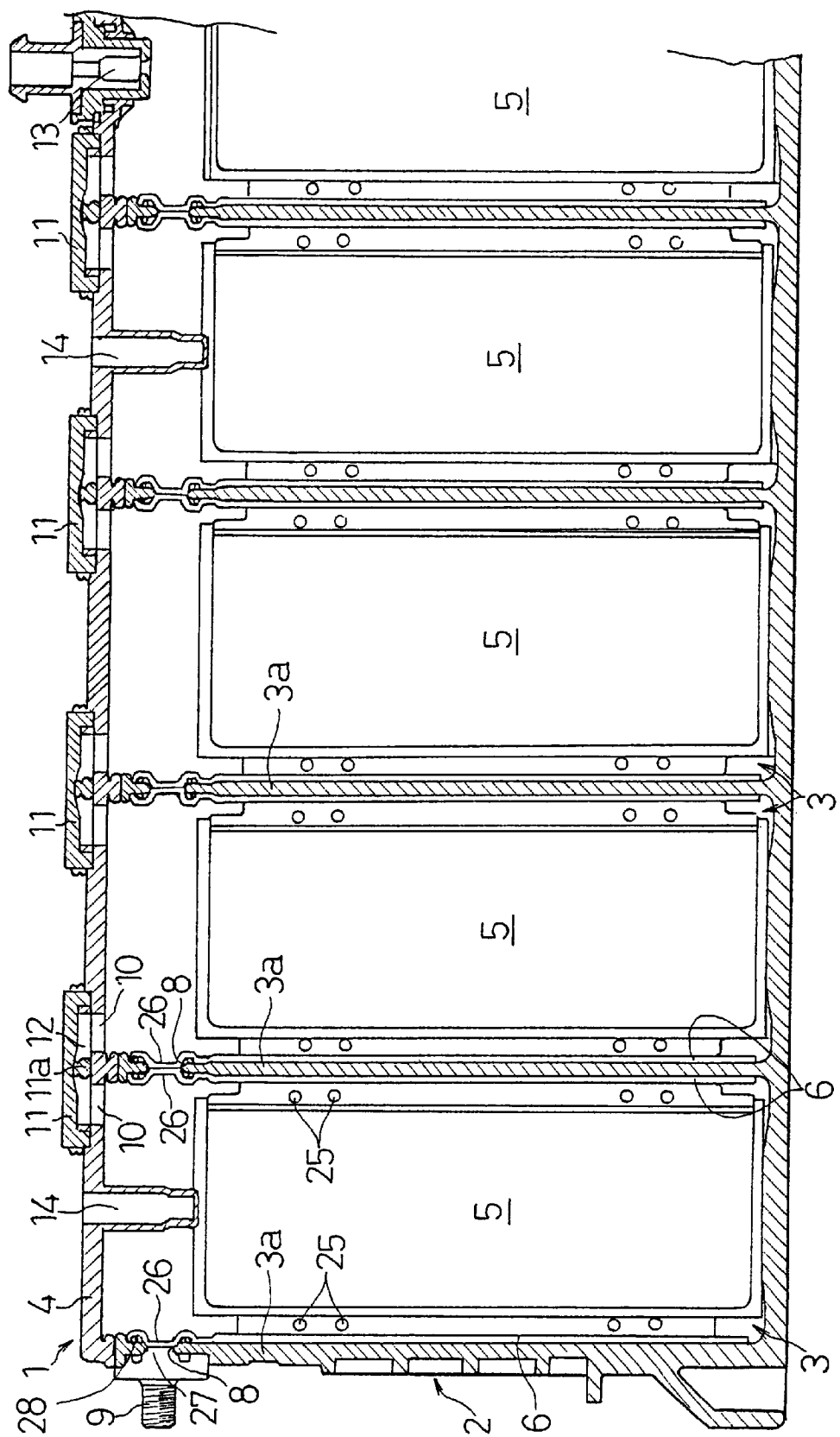
FIG. 2 is a partial longitudinal cross-sectional side view of the same embodiment.

The sealed prismatic battery module of this embodiment is a nickel metal hydride battery, which is suitable for use as a drive power source for an electric vehicle. As shown in FIGS. 1 and 2, a battery module 1 is made up of a plurality of (six in the example shown in the drawing) cells 7, arranged adjacent each other in a row. Cell cases 3 of each of the cells, which are formed in a prismatic fashion with short lateral walls 3a, long lateral walls, and open top ends, are mutually integrated on their short lateral walls 3a, thereby constituting an integral battery case 2. The upper open ends of the cell cases 3 are closed all together by an integral lid member 4.

Each of the cell cases 3 constitutes a cell 7, accommodating therein an electrode plate group 5 including collector plates 6 bonded to the opposite lateral ends of the electrode plate group 5 together with electrolyte. The electrode plate group 5 comprises a large number of positive electrode plates and negative electrode plates arranged parallel to the long lateral walls of the cell cases 3 and layered in the direction of the short lateral walls 3a of the cell cases 3, with intervening separators therebetween.

Connection holes 8 are formed at the upper edge portions of the outer short lateral walls 3a of the cell cases 3 at the two ends of the integral battery case 2 and between each two cell cases 3. Positive and negative connection terminals 9 are respectively mounted to the connection holes 8 at the outer short lateral walls 3a of the two outer cell cases 3, and connection fittings 9 for serially connecting two adjacent cells 7 are mounted to the connection holes 8 in the intermediate short lateral walls between each two cell cases 3.

On the top face of the lid member 4, through holes 10 are formed in adjacent edge portions of neighboring cell cases 3, 3. Communicating lids 11 forming communicating paths 12 for connecting two through holes 10, 10 are welded onto the lid member 4. Numeral 11a denotes reinforcing protrusions protruding from the middle of the inner wall of the communicating lids 11. The size of the reinforcing protrusions 11a is such that they do not close the communicating paths 12, and their leading ends are abutted against and welded to the top face of the lid member 4, ensuring the pressure strength of the communicating lids 11. The integrated battery case 2, the lid member 4 and the communicating lids 11 are made of a synthetic resin material, such as a PP/PPE alloy, and they are repellent against the electrolyte.

In addition, the lid member 4 is provided with one safety vent 13, so as to release pressure when the internal pressure in the cell cases 3 has exceeded a certain value. Moreover, a sensor mounting hole 14 for mounting a temperature detection sensor for detecting the temperature of the cells 7 is formed in the cell cases 3 of suitable cells 7 such that the bottom of the sensor mounting hole contacts the upper end of the electrode plate group 5.

The long lateral walls of six cells 7 together form an integral side wall 15 of the integral battery case 2. On this side wall 15 of the integral battery case 2, protruding ribs 16 that extend vertically are provided at positions corresponding to the lateral edges of two adjacent cell cases 3. Further, a large number of relatively small circular protrusions 17 are formed at suitable intervals in matrix fashion between each two ribs 16. The ribs 16 and the protrusions 17 have the same eight. Furthermore, coupling ribs 18a and 18b having the same height as the ribs 16 and the protrusions 17 are formed on the side walls of the upper edge of the cell cases 3 and the side walls of the lid member 4, such as to bridge across the side walls of the cell cases 3 and the lid member 4, at positions corresponding to an extension of the ribs 16 and the protrusions 17. When a plurality of integral battery cases 2 are arranged in a row in parallel to constitute a battery pack, the ribs 16, the protrusions 17 and the coupling ribs 18a and 18b form coolant passages for cooling the cell cases 3 effectively and uniformly.

A plurality of protrusions 19 and indentations 20, for positioning and fitting together integral battery cases 2 when their side walls 15 are abutted on each other, are arranged substantially in the middle of the outer surface of the two ribs 16 positioned symmetrical with the centerline of the side wall of the integral battery case 2.

Figure 3:
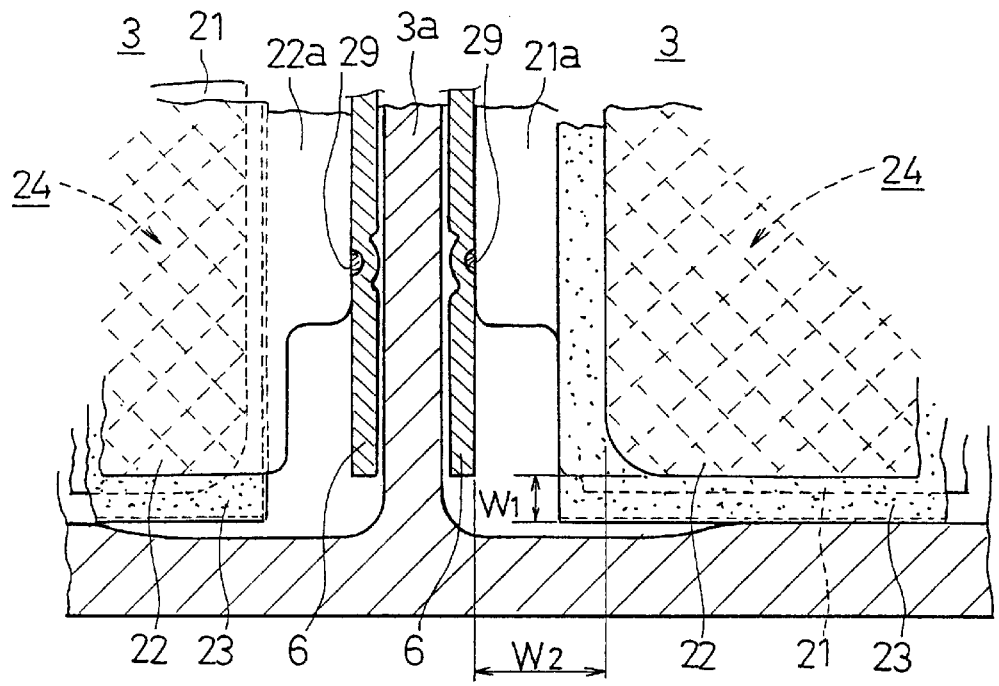
FIG. 3 is a partial, longitudinal cross-sectional front view of the same embodiment.
Figure 4:
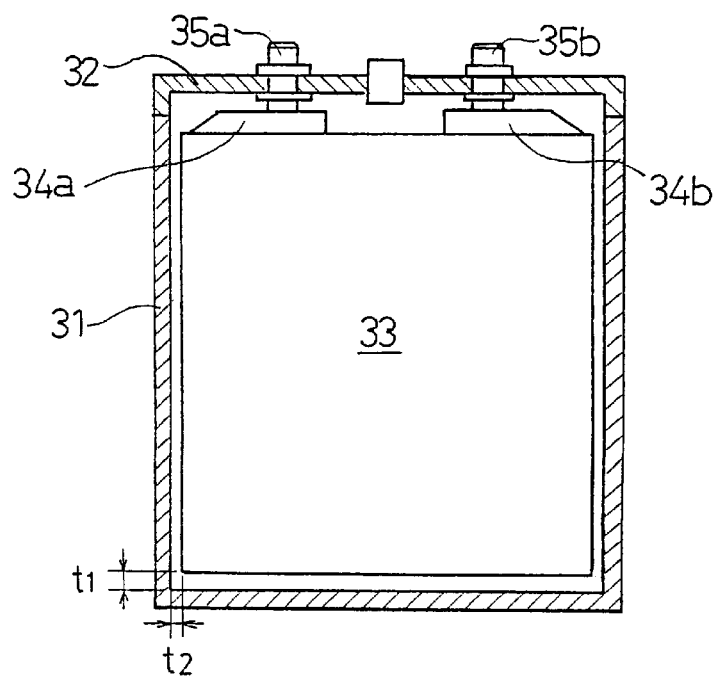
FIG. 4 is a longitudinal cross-sectional view of a conventionaled prismatic battery.

The aforementioned electrode plate group 5 comprises, as shown in FIG. 4, a large number of positive electrode plates 21 and negative electrode plates 22 arranged alternately, wherein the positive electrode plates 21 are covered with separators 23 in the form of a bag having an opening on one side. The positive electrode plates 21 and the negative electrode plates 22 are stacked upon one another with separators 23 therebetween, thereby constituting the electrode plate unit 5. In FIG. 3, the region indicated by oblique lines makes superposed portions 24, where the positive electrode plates 21 and the negative electrode plates 22 oppose each other with the intervening separators 23 and generate electric power. The lateral edges of the group of positive electrode plates 21 protrude beyond the group of negative electrode plates 22 on one side, and the lateral edges of the group of negative electrode plates 22 protrude beyond the group of positive electrode plates 21 on the opposite side, and these protruding lateral portions form the lead portions 21a and 22a, to the lateral ends of which collector plates 6 are welded, respectively. Reference numeral 29 denotes a solder material for welding the collector plates 6 to the lead portions 21a, 22a, the solder material being arranged in a plurality of rows at suitable intervals along the lengthwise direction of the collector plates 6.

The positive electrode plates 21 are made of Ni foamed metal. The lead portion 21a is constructed by compressing one lateral edge of the plate of foamed metal and attaching a lead plate on one surface of the lead portion 21a by ultrasonic welding or seam welding. The negative electrode plates 22 are made of Ni punched metal coated with an active material except for lead portions 22a.

Numeral 25 denotes pairs of positioning holes formed in the lead portions 21a and 22a at a suitable distance from the top and the bottom thereof. By inserting positioning pins into these positioning holes 25 and by applying pressure on the lateral ends of the lead portions 21a and 22a, these lateral ends of the lead portions 21a and 22a are aligned and welded reliably and evenly to the collector plates 6.

The collector plate 6 are welded to the opposite lateral edges of the electrode plate group 5. As shown in FIG. 2, at the upper edge of a collector plate 6, a connection projection 26 is formed such as to protrude outwards. By fitting this connection projection 26 into a connection hole 8 formed at the upper edge of the short lateral wall 3a of the cell case 3, the electrode plate group 5 is fixedly positioned with respect to the cell case. As can be seen from FIG. 2, a plurality of cells 7 are arranged adjacent each other, with the connection projections 26 of the collector plates 6 being fitted in the connection holes 8 in the short lateral walls 3a of the cell cases 3 and welded together. Thereby, the electrode plate group 5 of each of the cells 7 is fixed on the short lateral walls 3a of respective cell cases 3, as well as mutual electrical connection between adjacent cells 7 is achieved.

On the outer face of the short lateral walls 3a of the cells at opposite outer ends of the battery module 1, an electrode terminal 9 is attached. The electrode terminal 9 is also provided with a connection projection 27 that can fit into the connection hole 8, so that it can be welded to the connection projection 26 of the collector plate 6. Annular grooves are formed around the connection projections 26 of the collector plates 6 and the electrode terminal 9, in which O-rings 28 are fitted so as to seal the holes in the short lateral walls 3a.

In a state wherein the electrode plate group 5 is fixedly positioned within the cell case 3, the distance $W_1$ between the inner bottom surface of the cell case 3 and the superposed portions 24 where the electrode plates of both polarities are laminated upon one another, as shown in FIG. 3, is set within the range of 0.5 mm$\leq W_1 \leq$3 mm. Furthermore, the distance $W_2$ between one lateral edge of the superposed portions 24 and the collector plate 6 on one side is set within the range of 2 mm$\leq W_2 \leq$10 mm.

According to the battery module 1 of the present invention, as described above, each of the plurality of the cells accommodates therein a group of electrode 5, to which collector plates 6 are bonded on the opposite lateral ends of the group of electrode plates; the connection projections 26 on the collector plates 6 are fitted in the connection holes 8 formed in the short lateral walls 3a of the cell cases 3; and the connection projections of two adjacent cells 7 are abutted and welded together, while the connection projections 26 of the collector plates 6 in the cells 7 at opposite ends of the battery module 1 are welded to the connection projections 27 of the electrode terminals 9 on the outer face of the cell cases 3. Thereby, the electrode plate group 5 is appropriately fixed in position in each of the cell cases 3. At the same time, neighboring cells 7 are connected in series, and the cells at the outer opposite ends of the battery module 1 are connected to the electrode terminals 9 that protrude on the opposite ends of the integral battery case 2.

In the battery module 1 of the present invention, the electrode plate groups 5 can be fixed with respect to the cell cases 3 by using the structure for connecting the electrode plate groups 5 of the plurality of adjacent cells 7 through the short lateral walls 3a of the cell cases 3, or the structure for connecting the electrode plate groups 5 of the outer cells 7 at opposite ends of the battery module 1 to the electrode terminals 9. Accordingly, the battery module can be constructed simply and compactly at low cost. Moreover, the neighboring cells 7 are connected within the integral battery case 2 and since the connection configuration of the cells 7 is not exposed to the outside, the installation space for the battery module 1 can be made compact.

As described above, since the cell case 3 and the electrode plate group 5 are so designed that, when the electrode plate group 5 is fixed in position within the cell case 3, there is always provided a gap $W_1$ between the inner bottom surface of the cell case 3 and the superposed portions 24 of the electrode plates of both polarities within the range of 0.5 mm$\leq W_1 \leq$3 mm, and a gap $W_2$ between one lateral edge of the superposed portions 24 and the collector plate 6 on one side within the range of 2 mm$\leq W_2 \leq$10 mm, liquid electrolyte can be readily and stably injected into the cell case 3 from the upper end of the cell case 3 through the gap between the collector plate 6 and the electrode plate group 5, using an injection nozzle. The liquid electrolyte can smoothly flow through the gaps and be distributed evenly, whereby stable battery performance can be ensured.

After injecting the liquid electrolyte, the lid member 4 is welded to the upper end of the integral battery case 2, thereby completing the battery module 1.

In this battery module 1, because there are provided the above mentioned gaps between the inner bottom surface or the short lateral walls and the electrode plate group 5, allowing for expansion and contraction of the electrode plate group 5 that occur during charging and discharging of the battery, deterioration of battery performance resulting from deformation of the electrode plate groups can be prevented.

Since the neighboring cells 7 are connected in series by welding the connection projections 26 formed on the collector plates 6 by press-molding, no additional components for connection are necessary. Therefore, the cells can be connected simply with a reduced number of components at low cost. Moreover, because the connection projections 26 are integral with the collector plates 6 and the abutted connection projections 26 are welded together at one point, the electric resistance at the connecting portions is remarkably low.

Furthermore, in the electrode plate groups 5 of the cells 7, the lateral edge portions of the group of positive electrode plates 21 protrude beyond the group of negative electrode plates 22 on one side, and the lateral edge portions of the group of negative electrode plates 22 protrude beyond the group of positive electrode plates 21 on the opposite side, and these protruding lateral portions form the lead portions 21a and 22a, to which collector plates 6 are welded over their entire length. Therefore, the average distance from the surfaces of the electrodes 21 and 22 to the collector plates 6 can be made short, and as a result, the internal battery resistance can be made small and the utilization rate of the electrode active material becomes large, which increases the battery output.

Moreover, on the top face of the lid member 4, through holes 10 are formed in adjacent edge portions of neighboring cell cases 3, 3. Communicating lids 11 forming communicating paths 12 for connecting two through holes 10, 10 are welded onto the lid member 4. Thereby, the internal pressure between the plurality of cells can be made uniform, and it is prevented that life of particular cells 7 is decreased by partial rise in the internal pressure. Life of the entire battery module 1 is thereby prevented from being diminished. Moreover, it is only necessary to provide a single safety vent 14 on the lid member 4, and a further decrease in cost can be achieved.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module comprising a plurality of cells connected together adjacent each other, each of said plurality of cells comprising:
- a prismatic cell case having short lateral walls and long lateral walls;
- a group of electrode plates including a plurality of positive electrode plates and a plurality of negative electrode plates parallel to said long lateral walls of said cell case and laminated together with intervening separators therebetween;
- a collector plate of positive polarity and a collector plate of negative polarity bonded to said plurality of positive electrode plates and to said plurality of negative electrode plates, respectively, at lateral opposite ends of said group of electrode plates, wherein each of said collector plates is fixed on one of said short lateral walls of said cell case so as to arrange said group of electrode plates in a predetermined position within said cell case;
- liquid electrolyte in said cell case; and
- a lid member for sealing an open end of said cell case.

2. The battery module according to claim 1, further comprising connection holes formed in said short lateral walls of said cell case and connection projections formed on said collector plates, wherein said collector plates are fixed on said short lateral walls of said cell case by fitting said connection projections of said collector plates into said connection holes in said short lateral walls of said cell case.

3. The battery module according to claim 2, further comprising external electrode terminals attached on an outer face at opposite ends of said battery module, said external electrode terminals formed with connection protrusions that fit in said connection holes in said short lateral walls of said cell case, wherein neighboring cells are mutually connected by welding said connection projections of said collector plates through said connection holes in said short lateral walls of said cell case, and two cells located at opposite ends of said battery module are connected to said external electrode terminals by welding said connection projections of said collector plates and said external electrode terminals through said connection holes in said short lateral walls of said cell case.

4. The battery module according to claim 1, wherein $0.5 \text{ mm} \leq W_1 \leq 3 \text{ mm}$ and $2 \text{ mm} \leq W_2 \leq 10 \text{ mm}$, where $W_1$ is a distance between an inner bottom surface of said cell case and a lower edge of superposed portions of said group of electrode plates where said positive electrode plates and said negative electrode plates are laminated upon one another, and $W_2$ is a distance between either lateral edge of said superposed portions and said collector plates.

* * * * *